(No Model.)  2 Sheets—Sheet 1.

W. F. WELLMAN.
STAVE JOINTING MACHINE.

No. 306,885. Patented Oct. 21, 1884.

WITNESSES:
Donn Twitchell
C. Sedgwick

INVENTOR:
W. F. Wellman
BY Munn & Co.
ATTORNEYS.

(No Model.)
2 Sheets—Sheet 2.
W. F. WELLMAN.
STAVE JOINTING MACHINE.
No. 306,885. Patented Oct. 21, 1884.
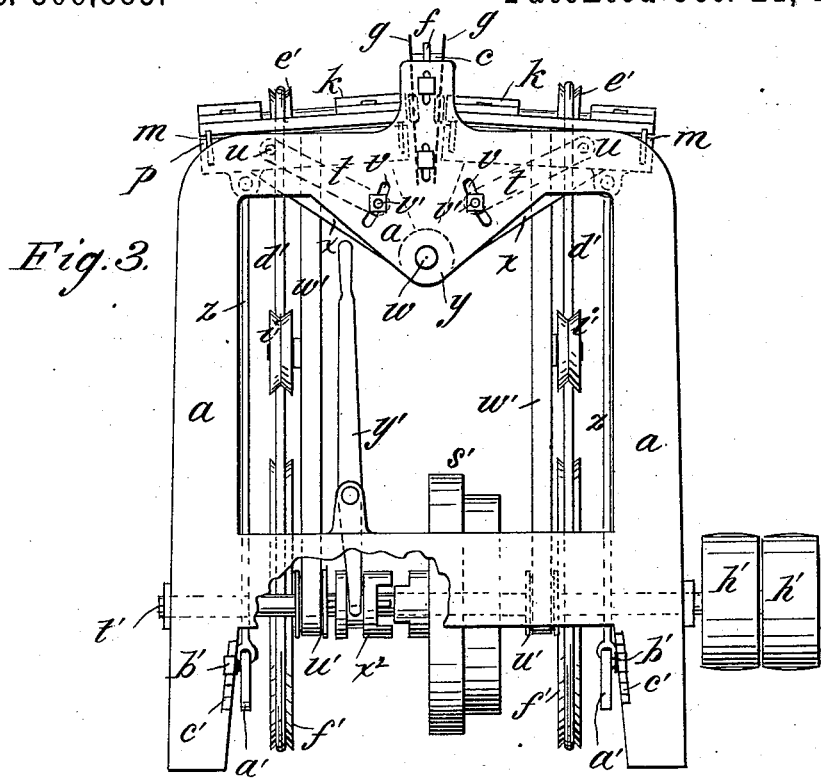
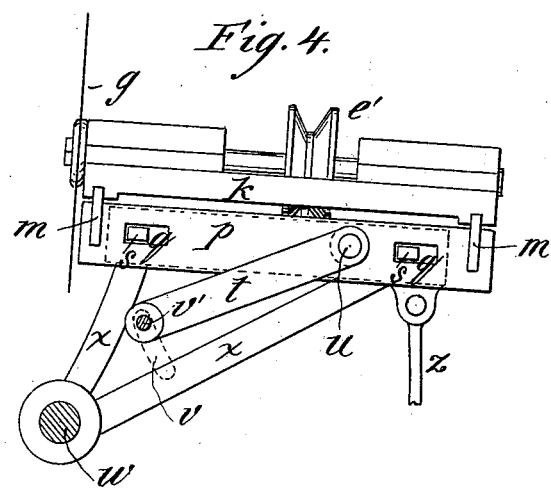
WITNESSES:
Donn Twitchell.
C. Sedgwick.
INVENTOR:
W. F. Wellman
BY Munn & Co.
ATTORNEYS.

UNITED STATES PATENT OFFICE.

WILLARD FRANK WELLMAN, OF BELFAST, MAINE, ASSIGNOR OF ONE-HALF TO ELMER SMALL, OF SAME PLACE.

STAVE-JOINTING MACHINE.

SPECIFICATION forming part of Letters Patent No. 306,885, dated October 21, 1884.

Application filed November 17, 1883. (No model.)

*To all whom it may concern:*

Be it known that I, WILLARD F. WELLMAN, of Belfast, in the county of Waldo and State of Maine, have invented a new and Improved Stave-Jointing Machine, of which the following is a full, clear, and exact description.

My invention consists of improved contrivances of stave-jointing mechanism, whereby it is designed to provide a simple machine to joint both edges of a barrel-stave at once and make the proper curves for the bulge on staves of all widths, so that a barrel made up from all wide staves will be of the same shape as one made up of all narrow staves, the said machine being automatic, except as to the putting on and taking off the staves and the starting of the saw-carriages when the staves are set ready for jointing, all as hereinafter fully described.

Reference is to be had to the accompanying drawings, forming a part of this specification, in which similar letters of reference indicate corresponding parts in all the figures.

Figure 1:
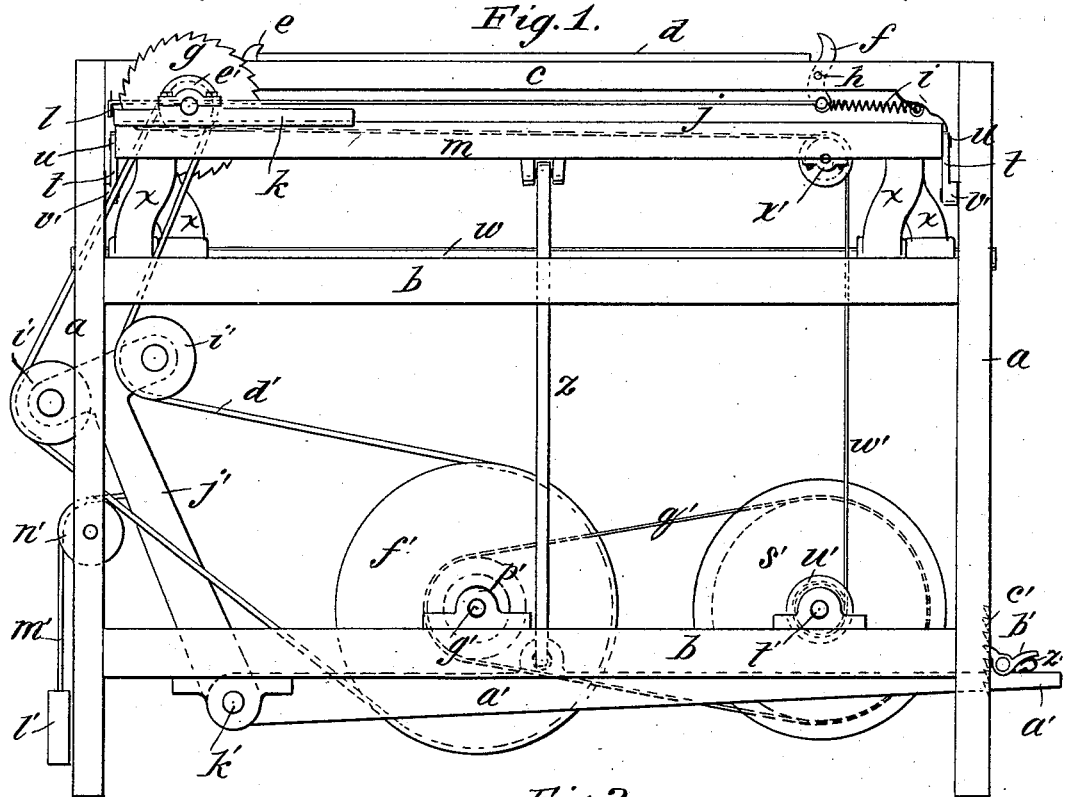
Figure 2:
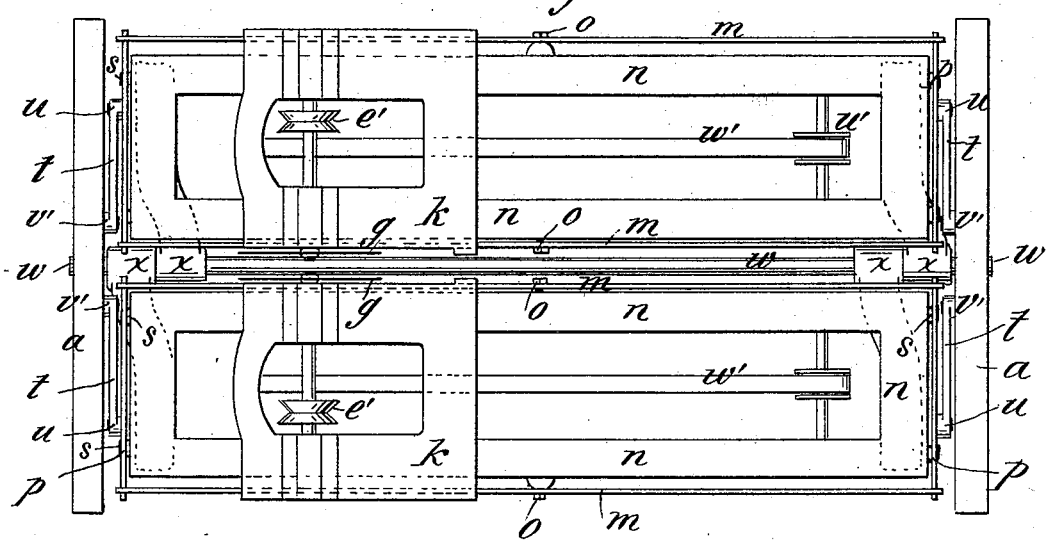

Figure 1 is a side elevation of my improved stave-jointing machine. Fig. 2 is a plan view without the bed and the stave-holding dogs. Fig. 3 is an end elevation with a part of the frame broken out; and Fig. 4 is a detail representing one of the saw-carriages and its support in end elevation and on an enlarged scale.

On the top and along the center of the frame, consisting of the uprights $a$ and horizontal bars $b$, connecting said uprights, I arrange the bed $c$, whereon the staves $d$ to be jointed are to be secured by the stationary knife-edged dogs $e$ and the pivoted dog $f$ between two saws $g$, to be jointed on both edges at the same time. The dog $f$ is fixed on a pivot, $h$, to be detached from the end of the stave to release it when finished, and to shift back to allow the staves to be put in position on the bed. Said dog has a spring, $i$, to pull it forward against the end of the staves to secure them while being jointed; and said dog also has a trip-rod, $j$, by which one of the saw-carriages $k$ automatically trips the dog and releases the staves by catching the rod-angle $l$, when the said carriage shifts back, and shifting the rod a little just before the carriage comes to rest at the starting-point.

The saw-carriages $k$ are mounted on the spring guide-rails $m$, that are connected at the middle of the sides of the bed-frames $n$ by stud-bolts $o$, said guide-rails being mounted at the ends on bars $p$, that have support on the ends of the bed-frames $n$ by slots $q$ in bars $p$, and studs $s$ on frames $n$, so that they may shift with relation to the ends of said frames, and are connected by links $t$ with the uprights $a$, said links being pivoted to the bars $p$ at $u$, and connected to the uprights $a$ by curved slots $v$ and adjusting bolts $v'$, said slots being arranged to traverse a radial line between pivots $u$ and a shaft, $w$, whereon the bed-frames $n$ are pivoted by arms $x$, said shaft being mounted in bearings $y$ of the uprights $a$ of the frame, and being arranged with relation to the bed $c$, whereon the staves are placed to be trimmed about as the center of an average barrel is to the staves, so that the saws $g$, which are radial to said shaft $w$, will joint the edges of wide or narrow staves at the proper bevel, said saws being shifted toward or from each other, according as the staves are wide or narrow, by swinging the bed-frames $n$ on the shaft $w$, for which said frames are connected by a rod, $z$, with a foot-lever, $a'$, adapted to be raised and lowered by the operator with his foot, and having a pawl, $b'$, to engage a rack, $c'$, on the frame to hold the lever wherever it may be set. Each bed-frame $n$ has a lever, $a'$, to be set independently of the other.

The effect of the links $t$ is to cause the bars $p$, supporting the ends of the guide-rails $m$, to swing differentially to the swing of the bed-frame, and thus to spring and curve the rails $m$, to cause the saws to curve the edges of the staves proportionately to the width of the staves, the arrangement being such that the rails curve in proportion to the distance the saws swing apart, and straighten as they swing toward each other. By shifting the links $t$ up and down in the slots $v$ the curves may be made greater or less, according to the required bulge of the barrel.

The saws are geared with belts $d'$ and pulleys $e'$, with driving-pulleys $f'$ on the main shaft $g'$, having the fast and loose pulleys $h'$, for applying the power to the machine, said belts $d'$ passing over tightening-pulleys $i'$ on a rock-arm, $j'$, pivoted to the frame at $k'$, and having a weight, $l'$, cord $m'$, and pulley $n'$, to bear the pulleys $i'$ with the requisite force against the belts $d'$ to maintain their tension and for driving the saws, while allowing the carriages to traverse the rails $m$, for carrying the saws to and fro along the staves. For causing the saw-carriages $k$ to thus traverse the rails $m$ along the staves, the main shaft has a cone-pulley, $p'$, from which a belt, $q'$, runs onto a cone-pulley, $s'$, on a counter-shaft, $t'$, which has a couple of spools, $u'$, from which straps $w'$ extend over guide-pulleys $x'$ to the carriages $k$ and connect with them, so that by the winding of the straps $w'$ upon the spools the carriages will be drawn forward, and when said spools are disconnected from the driving-gear the rock-arm $j'$ and the weight $l'$ and cord $m'$ will draw the carriages back.

To disconnect the counter-shaft from the cone-pulley $s'$ and allow the carriages to be drawn back, said pulley $s'$ is fitted loosely on the counter-shaft $t'$, and a clutch, $x^2$, and a shifting-lever, $y'$, are provided for connecting and disconnecting it.

The clutch-lever $y'$ is to be shifted by hand for connecting the cone-pulley $s'$ and starting the carriages; but in practice it is to be tripped by an attachment on one of the saw-carriages adapted to touch and push it over at the moment the saws cut through the staves at the ends.

The pawls $b'$ are so arranged on the levers $a'$ that the operator can detach them from the racks $c'$ with his foot at the same time that he works the levers with his foot, and they have a spring, $z'$, to re-engage them with the racks. The pull of the spring-rails $m$ on the links $t$ tends to swing the bed-frames upward, or against the downward pull of the levers $a'$, so that for the upward shift of the levers $a'$ the operator has only to detach the pawl and allow the lever to rise to the proper position, and then let the pawl engage with the rack. For shifting the other way, he merely presses the lever down, allowing the pawl to shift along the teeth of the rack, with which it engages whenever the lever stops.

Having thus fully described my invention, I claim as new and desire to secure by Letters Patent—

1. In a stave-jointing machine, the combination, with the stave-holding bed, of the saw-carriage supporting and guiding rails about centrally connected to the pivotally-supported bed-frame, and adapted to be sprung in the desired curvature for the edges of the staves, and to automatically assume upon the removal of the force applied to curve or spring them their normal position, substantially as and for the purpose set forth.

2. In a stave-jointing machine, the combination, with the stave-holding bed, of the saw-carriages traveling upon rails adapted to be sprung in the desired curvature for the edges of the staves, and movably connected to the pivoted bed-frame, substantially as and for the purpose set forth.

3. In a stave-jointing machine, the combination, with the stave-holding bed, of the saw-carriages with their guide and supporting rails adapted to be sprung in the desired curvature for the edges of the staves, said rails also being movably connected to the bed-frames, the bed-frames being pivoted upon a common axis, and the means of connection between the rails and the bed-frame being adjustably connected to the supporting uprights, substantially as and for the purpose set forth.

4. In a stave-jointing machine, the combination, with the stave-holding bed, of the saw-carriages with their supporting and guiding rails adapted to be sprung in the desired curvature for the staves, said rails being movably connected to the bed-frames, the bed-frames being pivoted upon a common axis, the means of connection between the rails and the bed-frames being adjustably connected to the supporting-uprights, and means for actuating or swinging the bed-frames, substantially as and for the purposes set forth.

5. In a stave-jointing machine, the combination, with the bed-frame pivotally connected to its support, of the saw-carriage and its supporting-rails adapted to be sprung in the desired curvature for the staves, said rails being connected at their ends by bars having slots which receive studs projecting from the bed-frame, and means for differentially shifting the rails and bed frame, substantially as and for the purpose set forth.

6. In a stave-jointing machine, the combination, with the stave-holding bed, of the saw-carriages with their supporting and guide rails adapted to be sprung in the desired curvature for the staves, said rails being movably connected to the bed-frames and also to the supporting-uprights, the bed-frames being pivoted upon a common axis, and means for differentially shifting the saw-carriage rails and the bed-frames, substantially as and for the purpose set forth.

7. The spring-rails $m$, connected at the middle to the bed $n$, and connected at the ends to the bars $p$, adjustably supported on the ends of the bed-frame and connected by links $t$ with the uprights $a$, said bed $n$ being adjustably pivoted on the shaft $w$, and the saw-carriage $k$ being arranged on the spring-rails and in relation to the stave-bed $c$, substantially as described.

8. In a stave-jointing machine, the combination, with the bed-frame pivotally connected to its support, of the saw-carriage rails adapted to be sprung in the desired curvature for the staves, and connected by bars having slots which receive studs projecting from the bed-frame, the links connecting the slotted bars to adjusting-pins arranged in curved slots in the supporting-uprights, and rods or bars connecting the bed-frame with foot-levers, substantially as and for the purpose set forth.

9. The combination, with the saw-carriage, of the pivoted spring-dog $f$ and the rod $j$, having the angle $l$, adapted to engage with the end of the carriage, substantially as and for the purpose set forth.

10. The combination, with the reciprocating saw-carriages $k$, carrying the saws, of the cone-pulleys $p'$ $s'$, the belt $q'$, encompassing said pulleys, the spools $u'$ $x'$, one set being arranged on the shaft of the pulley $s'$, the straps $w'$, connected to spools $u'$, thence passed over the spool $x'$, and connected to said saw-carriages, the driving-pulley $f'$, belt $d'$, passed against pulleys $i'$ of the rock-arms $j'$, having the weighted strap $m'$, and starting and stopping mechanism, substantially as and for the purpose set forth.

WILLARD FRANK WELLMAN.

Witnesses:
ARCHIBALD NICHOLSON,
JOSEPH WILLIAMSON.